(12) United States Patent
Schaefbauer et al.

(10) Patent No.: US 9,101,123 B2
(45) Date of Patent: Aug. 11, 2015

(54) LIVE BAIT DELIVERY SYSTEM

(71) Applicants: Mark E. Schaefbauer, League City, TX (US); Tina Schaefbauer, League City, TX (US)

(72) Inventors: Mark E. Schaefbauer, League City, TX (US); Tina Schaefbauer, League City, TX (US)

( * ) Notice: Subject to any disclaimer, the term of this patent is extended or adjusted under 35 U.S.C. 154(b) by 220 days.

(21) Appl. No.: 13/708,744

(22) Filed: Dec. 7, 2012

(65) Prior Publication Data

US 2013/0326931 A1  Dec. 12, 2013

Related U.S. Application Data

(60) Provisional application No. 61/658,503, filed on Jun. 12, 2012.

(51) Int. Cl.
*A01K 97/04* (2006.01)
*A01K 97/05* (2006.01)

(52) U.S. Cl.
CPC ............... *A01K 97/05* (2013.01); *A01K 97/04* (2013.01)

(58) Field of Classification Search
CPC ........ A01K 97/00; A01K 97/04; A01K 97/05
USPC ......................................... 43/54.1, 55, 56, 57
See application file for complete search history.

(56) References Cited

U.S. PATENT DOCUMENTS

| | | | |
|---|---|---|---|
| 299,690 A | 6/1884 | Sherwood | |
| 713,890 A | 11/1902 | Koch | |
| 1,110,892 A * | 9/1914 | Cather | 43/56 |
| 1,745,012 A | 1/1930 | Gilmore | |
| 2,002,572 A * | 5/1935 | Forbes et al. | 43/56 |
| 2,294,136 A | 8/1942 | Smith | |
| 2,474,745 A * | 6/1949 | Lewis | 43/56 |
| 2,613,843 A * | 10/1952 | Suda | 43/56 |
| 2,720,049 A | 10/1955 | Basky | |
| 2,884,736 A * | 5/1959 | Harrell | 43/56 |
| 3,000,132 A * | 9/1961 | Koistinen | 43/56 |
| 3,039,225 A * | 6/1962 | Semelka | 43/56 |
| 3,955,306 A | 5/1976 | Handa | |
| 4,606,143 A | 8/1986 | Murphy, Jr. | |
| 4,864,769 A | 9/1989 | Sandahl | |
| 5,267,410 A * | 12/1993 | Peyatt | 43/57 |
| 5,661,924 A * | 9/1997 | Maxwell | 43/55 |
| 5,799,435 A * | 9/1998 | Stafford | 43/57 |
| 6,729,066 B1 * | 5/2004 | Howley | 43/54.1 |
| 6,820,364 B1 * | 11/2004 | Tyson | 43/17.5 |
| 6,857,222 B1 * | 2/2005 | King | 43/56 |
| 6,886,291 B1 | 5/2005 | Jaggers | |
| 7,644,535 B2 | 1/2010 | Sloop | |
| 2005/0086851 A1 | 4/2005 | Carden, Jr. | |

\* cited by examiner

*Primary Examiner* — David Parsley
(74) *Attorney, Agent, or Firm* — Douglas W. Rommelmann; Andrews Kurth LLP

(57) ABSTRACT

A bait delivery system having a container for holding water and a lid releasably attached to the container. The lid includes a door opening and a door is pivotally connected to the lid. A rod extends through a rod opening in the lid and a loop assembly is connected to a lower end of the rod. A bait net is connected to the lid and has a lower portion connected to the loop assembly. The loop assembly has a first position adjacent the container bottom and a second position near the lid. The loop assembly is moved from the first position to the second position by raising the rod. In the first position the door is closed and in the second position the door is open. In a preferred embodiment, the door automatically opens as the loop assembly moves from the first to second position and automatically closes as the loop assembly moves from the second to first position.

23 Claims, 3 Drawing Sheets

LIVE BAIT DELIVERY SYSTEM

CROSS-REFERENCE TO RELATED APPLICATIONS

This application claims the benefit of U.S. Provisional Application Ser. No. 61/658,503 filed Jun. 12, 2012, entitled "Live Bait Delivery System." Applicant incorporates by reference herein U.S. Provisional Application Ser. No. 61/658,503 in its entirety.

BACKGROUND OF THE INVENTION

1. Field of the Invention

The present invention relates generally to a system for delivering live bait to a fisherman.

2. Description of the Related Art

Conventional bait buckets for live bait, such as minnows and shrimp, typically have a lid with a door on the top. The steps for retrieving a single piece of live bait can be more time consuming than an angler would like, especially when the fish are biting, or when the other anglers you are fishing with want you to be the bait retriever for the entire crew.

The following is representative of the process employed when using a conventional bait bucket:

1. Set your fishing pole down.
2. Locate and hold the dip net in one hand. (Note: When the fish are really biting and people are in a hurry to bait their hook and get back to fishing, quite often the dip net doesn't get placed in the same location and sometimes the dip net will accidently get dropped into the bait bucket. Placing your hand in the bait bucket to retrieve the dip net can potentially kill the bait if your skin is sweaty or has sunscreen or insect spray applied to it.)
3. Use your other hand to open the door on the bait bucket lid.
4. Insert the dip net into the bucket through the open door and begin chasing the live bait—while potentially injuring and/or stressing them out to a point that it will possibly kill some of the live bait before you get an opportunity to catch a fish with them.
5. Pull the dip net up from the bucket. (Quite often you will have successfully captured the aerator stone along with a few pieces of bait that are thrashing around in the dip net because they were just chased around the inside of the bucket getting hit with the dip net until they were eventually captured and pulled out of the water with a bubbling stone that is pulsing with air next to their head making them want to jump out of the net all the more.)
6. Pull one of the live bait out of the dip net and hold on to it while you use your other hand to dump the remaining bait left in the dip net back into the bucket.
7. Go back to where you set your fishing pole and pick it back up and grab the hook and bait up.

For many anglers, the total time typically takes about 40 to 60 seconds.

It is desirable to have a bait delivery system to retrieve bait from a bait bucket easily, quickly, conveniently and without injuring the live bait. It is also desirable to be able to retrieve bait from a bait delivery system using only one hand with as few steps as possible.

BRIEF SUMMARY OF THE INVENTION

In one embodiment of the present invention, a bait delivery system includes a water container and a lid releasably attached to the container. The lid includes a door opening and a door is pivotally connected to the lid. A rod extends through a rod opening in the lid and a loop assembly is connected to a lower end of the rod. A bait net is connected to the lid and has a lower portion connected to the loop assembly. The loop assembly has a first position adjacent the container bottom and a second position near the lid. The loop assembly is moved from the first position to the second position by raising the rod. In the first position the door is closed and in the second position the door s open. In a preferred embodiment, the door automatically opens as the loop assembly moves from the first to second position and automatically closes as the loop assembly moves from the second to first position.

BRIEF DESCRIPTION OF THE SEVERAL VIEWS OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate preferred embodiments of this invention, and are therefore not to be considered limiting of its scope, for the invention may admit to other equally effective embodiments that vary only in detail. In the drawings.

DESCRIPTION OF THE PREFERRED EMBODIMENTS

The preferred embodiments of the bait delivery system 10 of the present invention will now be described with reference to FIGS. 1-5.

Figure 1:
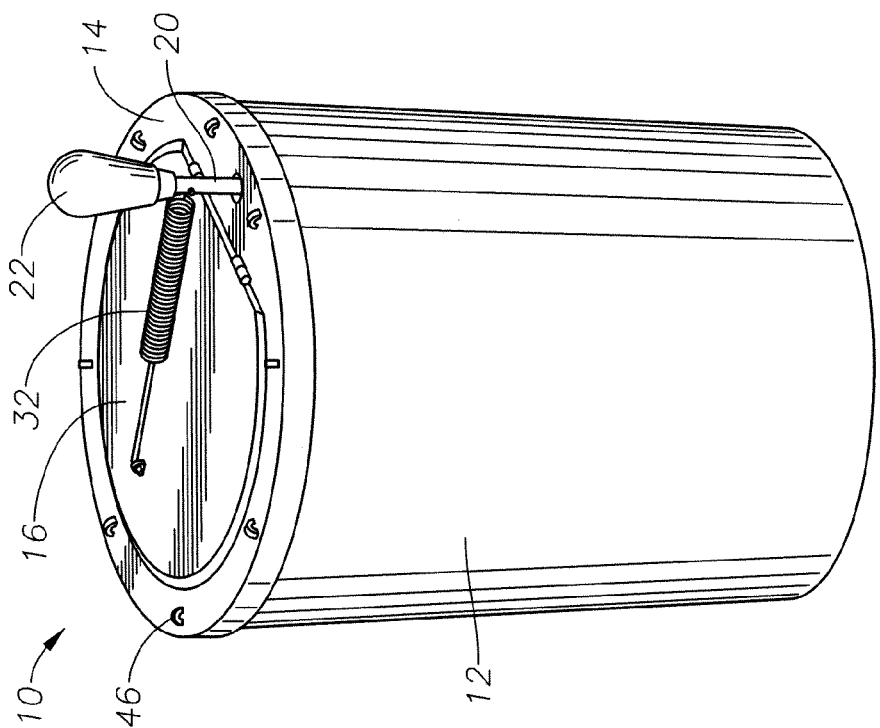
FIG. 1 is a perspective view of a preferred embodiment of the bait delivery system of the present invention, showing a door in a lid in a closed position.

Referring to FIG. 1, a preferred embodiment of the bait delivery system 10 comprises a container 12 having a lid 14 with a hinged door 16. Preferably, the container 12 is a standard five gallon plastic bucket, although other sizes and materials may be utilized. The lid 14 fits on top of the plastic bucket 12. Preferably, the lid 14 is securely and removably attached to the container 12 as for example by threads, snaps or other fastening means well known to those skilled in the art.

Figure 2:
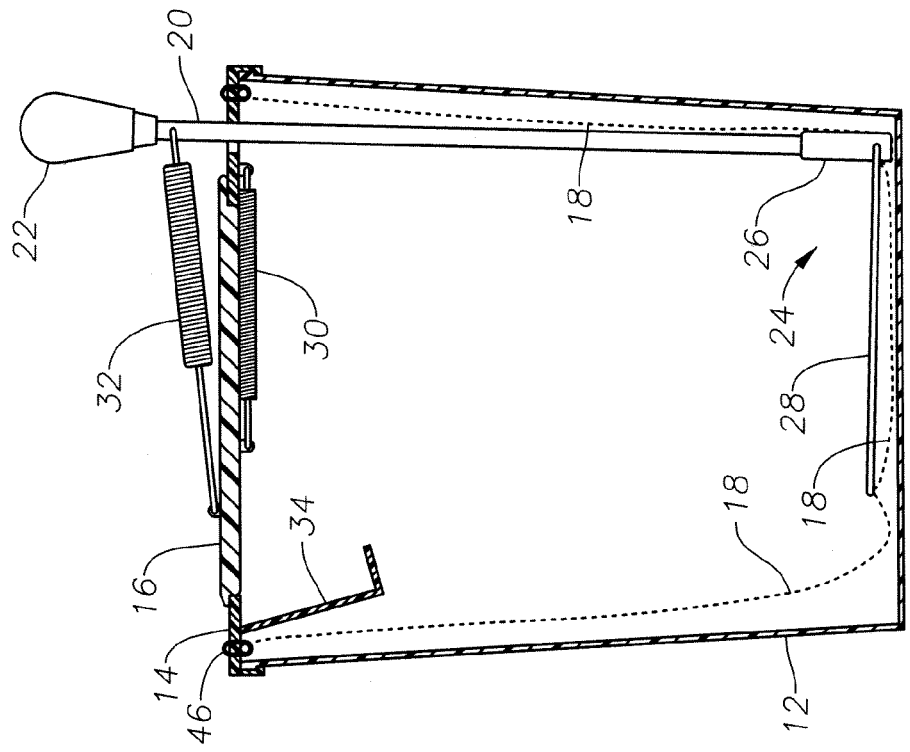
FIG. 2 is a sectional elevation view of the bait delivery system shown in FIG. 1, the dashed line illustrating a net attached to the lid and to a loop assembly, with portions of the net omitted for purposes of clarity.
Figure 3:
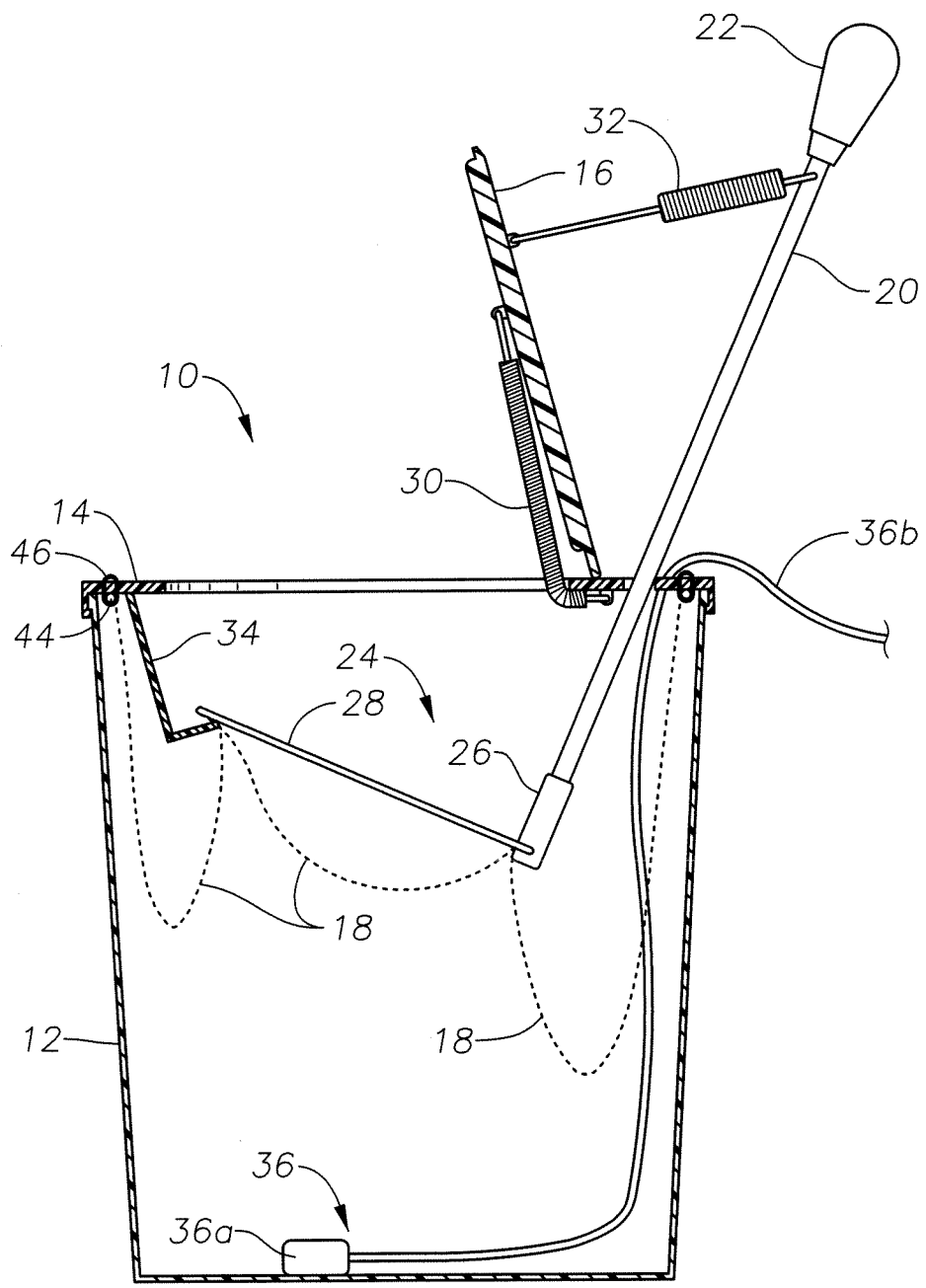
FIG. 3 is a sectional elevation view of another embodiment of the bait delivery system having an aerator assembly, the system shown with the door in an open position and the net, loop assembly and rod in a raised position supported by a bracket.
Figure 5:
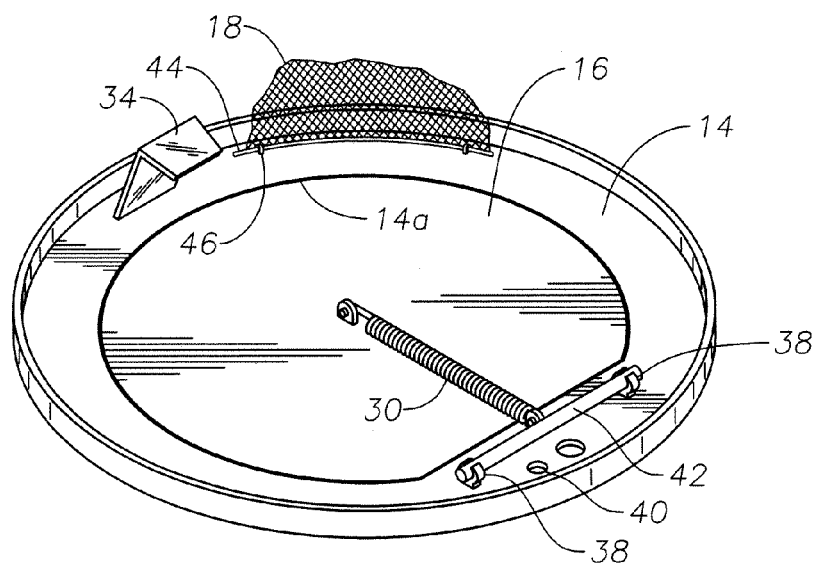
FIG. 5 is a perspective view of the bottom side of the lid, showing a portion of the net attached to the lid and a light source secured to the lid.

Referring to FIGS. 2, 3 and 5, a net 18, preferably of mesh suitable to allow water to pass while preventing the passage of the bait therethrough, is attached to the underside of the lid 14. Preferably, the net 18 extends near or to the container bottom and outermost circumference of the container wall as shown in FIG. 2. The net 18 may be attached or secured to the lid 14 by various means. A preferred technique, as shown in FIG. 5, is by attaching a length of cord 44, preferably ⅛ inch (⅛") diameter nylon cord, around the perimeter of the upper portion of the net forming the net opening for the bait, and securing the cord 44 to the lid 14 using tie wraps 46 extending through lid apertures. The cord 44 may be attached to the net 18 by weaving the cord 44 through the net 18, or by bonding or stitching the cord 44 to the net 18.

As shown in FIGS. 1-4, a rod 20 preferably has an upper knob 22 at one end and a loop assembly 24 attached at a lower end. In a preferred embodiment, the rod 20 is a fiberglass rod having a diameter of approximately ⅜" and the upper knob 22 is pull knob serving as a grip handle. Preferably, the knob 22 is made of ethylene vinyl acetate ("EVA") foam.

Figure 4:
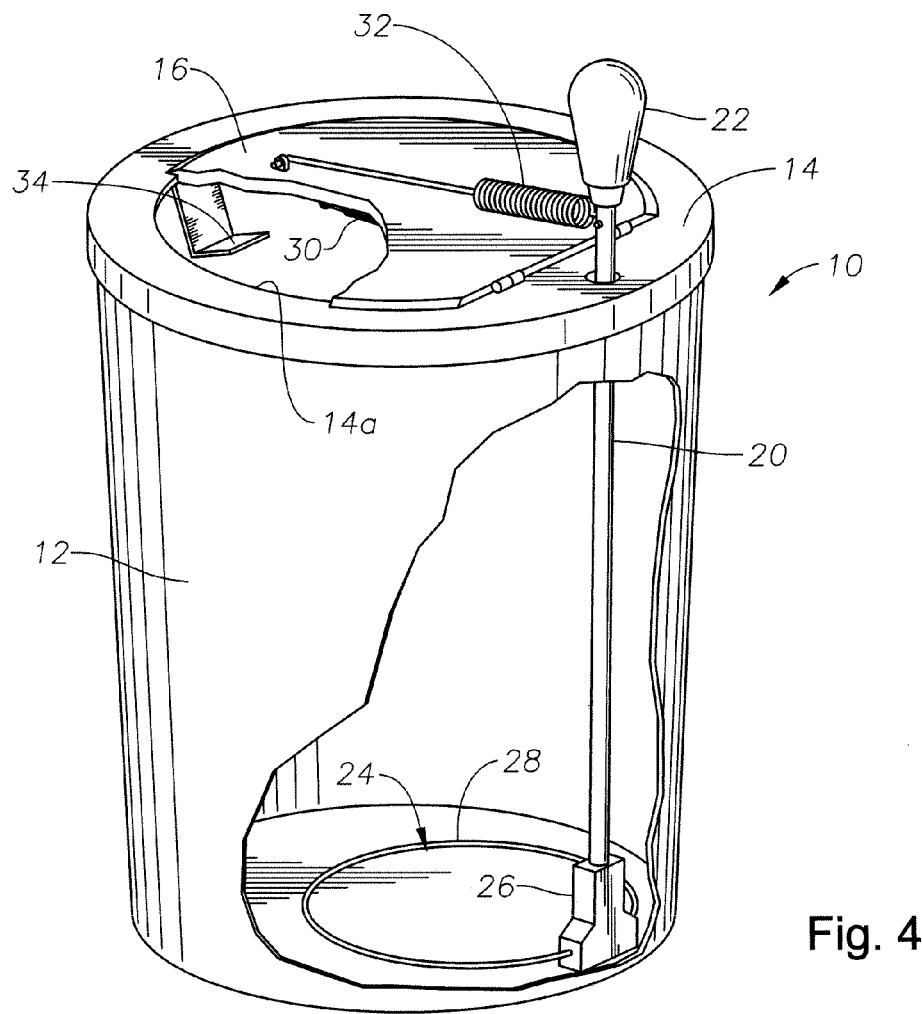
FIG. 4 is a perspective view of the bait delivery system shown in FIG. 1, with cutaway portions showing the bracket and loop assembly, with the net omitted for purposes of clarity.

Referring to FIG. 4, the loop assembly 24 comprises a loop 28, preferably formed of wire and more preferably formed of stainless steel wire, attached to a connector or clamping bracket 26. The clamping bracket 26 is used to join the loop 28 to the lower end of the rod 20. Preferably, the clamping bracket 26 secures the wire loop 28 to the rod 20 at an angle, preferably a right angle. In a preferred embodiment, the loop 28 is formed of 1\8" diameter stainless steel wire formed into approximately a seven and one half inch (7½") diameter circular hoop. A lower portion of the net 18 is preferably weaved around or otherwise connected to the loop 28 around its circumference. Referring to FIG. 3, the net 18 is preferably attached to the stainless steel wire loop 28 in such a manner that a suitable portion of the net freely hangs below the opening defined by the loop 28, thus forming, in essence a small dip net within the net 18 that is attached to the underside of the bait bucket lid 14.

As best shown in FIGS. 2, 3 and 5, a first or inner spring 30 has one end attached to the underside of the door 16 and a second end attached to the underside of the lid 14. Preferably, the second end of the inner spring 30 is attached to the lid 14 in the area below where the door pivot or hinge connection exists. The inner spring 30 is preferably an extension spring, preferably made of stainless steel. The inner spring 30 imparts a spring bias to normally maintain the door 16 in a closed position as shown in FIGS. 2, 4 and 5. Preferably, a second or outer spring 32 has one end attached to the topside of the door 16 and a second end attached to the upper portion of the rod grip handle 20 just below the pull knob 22.

Referring to FIGS. 2-5, a loop catch or bracket 34 is preferably attached to the underside of the lid 14 towards the front center of the door opening 14a and opposite the door hinged connection (FIGS. 4 and 5). The bracket 34 may be an angle bracket. As shown in FIG. 3, the bracket 34 serves as a docking location for the wire loop 28 to rest against while the captured bait is being removed from the bait bucket 12.

As shown in FIG. 3, a preferred embodiment of the bait delivery system 12 includes an aerator assembly 36. The aerator assembly 36 includes an aerator stone 36a connected to a flexible air hose 36b. Preferably, the air hose 36b is connected at a second end to an aerator pump (not shown). The lid 14 preferably includes a hole 40 (FIG. 5) through which the air hose 36b may freely pass. The air hose 36b has a length sufficient to allow the connected aerator stone 36a to be positioned on or near the bottom center of the bucket 12.

Although not required, it may be desirable to provide the delivery system 10 with a light source for night-time fishing. In the embodiment shown in FIG. 5, the underside of the lid 14 includes one or more clips 38 suitable to secure a light source 42, for example a glow stick, to the lid 14. In such a manner, with the door 16 open and the wire loop 28 resting on the lip of the small bracket 34, the light source 42 provides the night fisherman with an amount of light sufficient to grasp the live bait and bait the hook prior to closing the door 16.

The sum of these parts that make up the preferred embodiments of the bait delivery system function in unison as when the bucket is filled approximately three fourths capacity with water and stocked with live bait.

The following is representative of the process employed when using the bait delivery system according to a preferred embodiment:

1. Set your fishing pole next to you and hold the hook in one hand.
2. Use your other hand to pull up on the grip handle 20 and knob 22. The door 16 will open and you will be able to see the bait coming up in the net 18 that is attached to wire loop 28 at the base of the grip handle 20.
3. Continue to pull up and guide the grip handle 20 at an angle that will align the wire loop 28 just above the lip of the small bracket 34 that is attached to the underside of the lid 14.
4. Release the grip handle 20 when the wire loop 28 is resting on the lip of the small bracket 34 and reach into the bait bucket 12 to retrieve your bait from the net 18.
5. With the bait in one hand and the hook in the other, slightly bump the grip handle 20 with the hand that is holding the bait to knock the wire loop 28 off of the small bracket lip which will allow the grip handle 20 and the door 16 to travel back down to the closed position.
6. Bait the hook and fish.

The total time takes about 5 to 10 seconds.

When using the bait delivery system 10, the bait is surrounded by the net 18 at all times and the bait has nowhere to go other than up in the net 18 that is attached to the wire loop 28 which is attached to the grip handle 20.

The bait doesn't get stressed or injured because the only travel is straight up and most of the bait ends up within the inner section of the wire loop 28. The aerator hose 36b and stone 36a may preferably be routed outside of the net 18 such that the aerator stone 36a remains resting on the bottom of the bucket 12 during retrieval of the bait—never coming up with the bait.

The net 18 is attached to the underside of the lid 14 which allows one to easily exchange the water in the bait bucket 12 by simply lifting the lid 14 from the bucket 12, and do a quick dump and fill with the bucket 12 and then replace the lid 14. It is to be understood that by raising the lid 14 from the bucket 12, you also remove the net 18 and all the live bait from the bucket 12—making it extremely quick and easy to replace the water in the bucket 12.

Preferably, the inner spring 30 that is attached to the underside of the door 16 and lid 14 has two functions. The inner spring 30 holds the door 16 closed when the grip handle 20 is in its lowered position, and it also pulls the grip handle 20, wire loop 28 and lower portion of the net 18 back down to the lower portion of the bucket 12 when the grip handle 20 is released from the raised position.

Preferably, the outer spring 32 that is attached to the topside of the door 16 and the grip handle 20 has two functions. When the grip handle 20 is pulled upward, the door 16 will open. Referring to FIG. 3, as the user continues to pull upward on the grip handle 20, the user angles the direction of the grip handle 20 in a manner that aligns the loop 28 and a portion of the inner dip net 18 just over and above the lip of the resting bracket 34, then releases the grip handle 20 and the outer spring 32 draws the wire loop 28 towards the back of the resting bracket 34 holding the inner dip net 18 in place while retrieving a piece of bait. A slight bump of the grip handle 20 will shift the inner dip net off of the lip of the resting bracket 34 allowing the inner dip net portion to be pulled back down to the lower portion of the bucket 12 while the door 16 returns to the closed position.

The bait delivery system 10 is an integrated assembly that combines a bait bucket lid 14 with a bait retrieval net 18. The integrated bait delivery system 10 utilizes springs 30 and 32 to position the door 16 on the bait bucket lid 14 in the open and closed positions.

The integrated net 18, wire loop 28, and grip handle 20 function as a bait retrieval net inside the bait bucket 12.

The aerator stone 36a is preferably routed between the wall of the bait bucket 12 and the outside of the bait bucket retrieval net 18 to maintain the position of the aerator stone 36a on the bottom of the bait bucket 12 during bait retrieval.

The integrated bait delivery system 10 can be removed from the bait bucket 12 with the bait remaining captive in the net 18 so as to refresh the water in the bait bucket 12 with ease and speed.

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A bait delivery system comprising:
    a container for holding water;
    a lid releasably attached to the container, the lid including a door opening and a rod opening;
    a door pivotally connected to the lid;
    a bait net having an upper portion defining a net perimeter forming a net opening for the bait, the upper portion secured to the lid at a plurality of attachment points such that the net perimeter is maintained adjacent the lid;
    an elongate rod extending through the rod opening in the lid, the elongate rod arranged and designed to move axially within the rod opening during use of the bait delivery system; and
    a loop assembly within the container secured to a lower end of the elongate rod,
    wherein the bait net has a lower portion secured to the loop assembly.

2. The delivery system of claim 1, wherein the loop assembly comprises a substantially rigid loop that extends substantially at a right angle relative to the elongate rod, the substantially rigid loop defining a loop opening, wherein a portion of the bait net freely hangs within and below the loop opening.

3. The delivery system of claim 2, wherein the door is normally biased in a closed position.

4. The delivery system of claim 3, further comprising a first spring having a first end connected to the door and a second end connected to the lid, the first spring biasing the door in the closed position.

5. The delivery system of claim 4, wherein the first end of the first spring is connected to a lower surface of the door and the second end is connected to an underside of the lid.

6. The delivery system of claim 1, further comprising a light source attached to an underside of the lid to concentrate a light from the light source within the container, wherein the light source concentrates the light within the container when the door is in an open position.

7. The delivery system of claim 1, further comprising a bracket directly attached to and projecting from an underside of the lid, the bracket arranged and designed to provide upward support for the loop assembly.

8. The delivery system of claim 1, further comprising an aerator assembly having an aerator stone connected to a flexible air hose, the air hose extending through a hole in the lid and the aerator stone positioned within the container.

9. The delivery system of claim 8, wherein the aerator assembly is positioned outside of the bait net within the container.

10. The delivery system of claim 1, wherein the substantially rigid loop moves as the elongate rod moves.

11. The delivery system of claim 1, wherein the upper portion of the bait net being secured to an underside of the lid.

12. The delivery system of claim 11, wherein the bait net, lid and door combine to form a bait enclosure surrounding bait contained within the bait delivery system, with the bait being added or removed from the bait enclosure via the door.

13. The delivery system of claim 12, wherein the bait net, lid and door with the bait within the bait enclosure may be removed together from the container to allow replacement of water within the container.

14. The delivery system of claim 6, wherein the underside of the lid includes at least one clip arranged and designed to secure the light source and the light source is a glow stick.

15. A bait delivery system comprising:
    a container for holding water, the container having a bottom and a container wall;
    a lid releasably attached to the container, the lid including an upper surface, a lower surface, a door opening and a rod opening;
    a door connected to the lid via a hinge;
    an elongate rod extending through the rod opening, the elongate rod having an upper end extending above the lid and a lower end extending below the lid, the elongate rod arranged and designed to move axially within the rod opening during use of the bait delivery system;
    a loop assembly connected to the lower end of the elongate rod, the loop assembly including a substantially rigid loop;
    a bait net secured on the lid at a plurality of attachment points, the bait net extending from each of the attachment points to the loop assembly,
    wherein the elongate rod has a lowered position and a raised position, the loop assembly being adjacent the container bottom in the lowered position and being near the lid in the raised position.

16. The bait delivery system of claim 15, further comprising a loop support attached to the lower surface of the lid, the loop support arranged and designed to maintain the loop assembly and elongate rod in the raised position.

17. The bait delivery system of claim 15, wherein the door has an open position and a closed position, and in the lowered position of the elongate rod the door is in the closed position and in the raised position of the elongate rod the door is in the open position.

18. The bait delivery system of claim 17, further comprising a door opening member connected to the door and to the elongate rod, wherein in the raised position of the elongate rod the door opening member maintains the door in the open position.

19. The bait delivery system of claim 18, wherein the door opening member moves the door from the closed position to the open position as the elongate rod moves from the lowered position to the raised position.

20. The bait delivery system of claim 18, further comprising a loop support attached to the lower surface of the lid, the loop support arranged and designed to maintain the loop assembly and elongate rod in the raised position; and wherein the door opening member is a spring, and wherein as the elongate rod is raised to the raised position and the loop assembly is positioned onto the loop support, the spring opens the door and draws the loop assembly towards a back of the loop support allowing an operator to release his/her grip on the elongate rod and to retrieve a piece of bait.

21. The bait delivery system of claim 17, further comprising a lower spring having a first end connected to the door and a second end connected to the lid, wherein the lower spring biases the door in the closed position when the loop assembly and elongate rod are in the lowered position.

22. The bait delivery system of claim 21, wherein the lower spring moves the door from the open position to the closed position as the loop assembly and elongate rod move from the raised position to the lowered position.

23. The bait delivery system of claim 15, wherein the loop assembly is directly connected to the elongate rod.

* * * * *